Feb. 13, 1968   E. GRAU   3,368,841

MOTORCAR HAVING AN ADJUSTABLE FRONT TOP PANEL ASSEMBLY

Filed July 13, 1965

INVENTOR:
Erich Grau by
Michael J. Striker
Atty

United States Patent Office 3,368,841
Patented Feb. 13, 1968

3,368,841
MOTORCAR HAVING AN ADJUSTABLE
FRONT TOP PANEL ASSEMBLY
Erich Grau, Sersheim, Kreis Vaihingen (Enz), Germany
Filed July 13, 1965, Ser. No. 471,605
Claims priority, application Germany, July 16, 1964,
G 41,088
12 Claims. (Cl. 296—91)

ABSTRACT OF THE DISCLOSURE

A shielding assembly for automotive vehicles. The vehicle has a passenger compartment provided with a top opening and with a windshield which extends transversely of the opening and of the direction of movement of the vehicle. The windshield has an upper edge portion bounding the opening end part. The assembly comprises an elongated panel which extends transversely of the direction of movement of the vehicle. First means are provided mounting the panel for pivotal displacement about a first axis which is normal to the direction of movement so that the panel can be moved between a first and a second end position in which it is respectively fitted within the passenger compartment downwardly of the upper edge portion and without the passenger compartment upwardly of the upper edge portion. Second means mounts the panel for rotation about a second axis parallel to the first axis in any position of pivotal displacement of the panel about the first axis.

---

This invention relates to a sun visor, windshield and deflecting panel for motorcars having a sliding roof.

When the car is moving with the sliding roof in open position, the relative wind, which is increased by the fact that the roof is collapsed, enters the car body from the top and is considered a nuisance. The radiation of the sun is also inconvenient, particularly in hot regions.

For protection against these effects, it is known to provide a flap having an adjustable angle of incidence close to the front edge of the opening for the sliding roof. On the other hand, such a flap cannot be set in a position in which it deflects the relative wind into the interior of the car body, e.g., for scavenging the air when the car has been parked for a period of time. The panel according to the invention serves as a sun visor and windshield and enables an arbitrary introduction of the relative wind into all parts of the interior of the car body. For this purpose, the device according to the invention is characterized by a panel which has a pivotally movable longitudinal axis and is rotatable through 360° about said axis, the largest dimension of said panel being slightly smaller than the width of the opening for the sliding roof so that the axis of rotation of the panel can be set above the roof or below the roof or in the plane of the roof, as desired. This enables not only a shielding against the sun rays in known manner but also a control of the relative wind so that the latter is kept from the interior of the car body or introduced into the same at any desired rate and in any desired direction. In this specification "slightly smaller" means that the panel can fit the width of the opening without engaging the edge thereof. If the largest dimension of the panel were much smaller than the opening, the relative wind would always enter the interior of the car body past both sides of the panel.

The pivotal movement of the axis of rotation and the rotation of the panel about its axis are preferably enabled by articulated joints which can be locked, or by friction-type articulated joints, so that the axis and the panel will remain in their adjusted positions.

When the sliding roof is closed, the panel according to the invention may be adjusted to lie flat against the inside of the roof, like the known flap. Alternatively, the panel may be adjusted to lie in front of the windshield instead of the sun visor panels or in addition thereto. In these positions, the panel according to the invention does not obstruct the opening and closing movements of the sliding roof. The panel according to the invention consists preferably of transparent, colored plastics material. The panel is preferably rectangular and is suitably rotatable between two arms. Each of these arms has an articulated joint. The free end of each arm is fitted in a socket member. These socket members are secured to the stationary part of the roof of the car. With this arrangement, the panel according to the invention can be conveniently removed, e.g., for the use of the car during winter. The panel can subsequently be refitted. The socket openings for the arms consist preferably of bores having a circular cross-section. The free ends of the arms have also a circular cross-section and fit said bores irrespective of the design of the roof. The articulated arms may be replaced by bendable arms.

The invention is also applicable to convertible sedans and sports cars. In this case, the socket members for retaining the panel are secured to the frame of the windshield on both sides of the latter.

The drawing shows an illustrative embodiment of the invention diagrammatically and partly in section.

Figure 1:
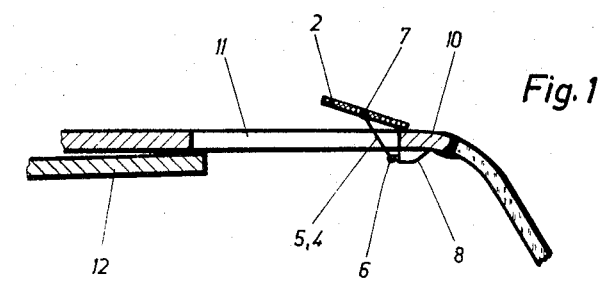
FIG. 1 is a longitudinal sectional view showing a car body having a sliding roof and a panel according to the invention, which panel is fitted into the socket members.
Figure 2:
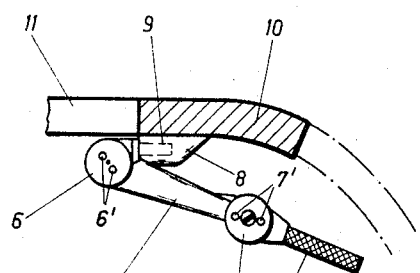
FIG. 2 is an enlarged fragmentary view showing the panel according to the invention as illustrated in FIG. 1, which panel has been adjusted to lie in part before the windshield.
Figure 3:
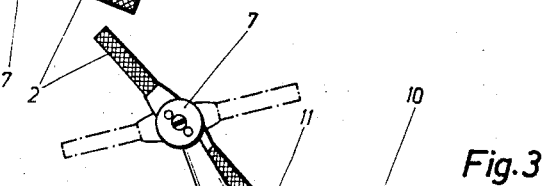
FIG. 3 is a fragmentary view similar to FIG. 2 and shows the panel according to the invention completely swung out in two different angular positions.
Figure 4:
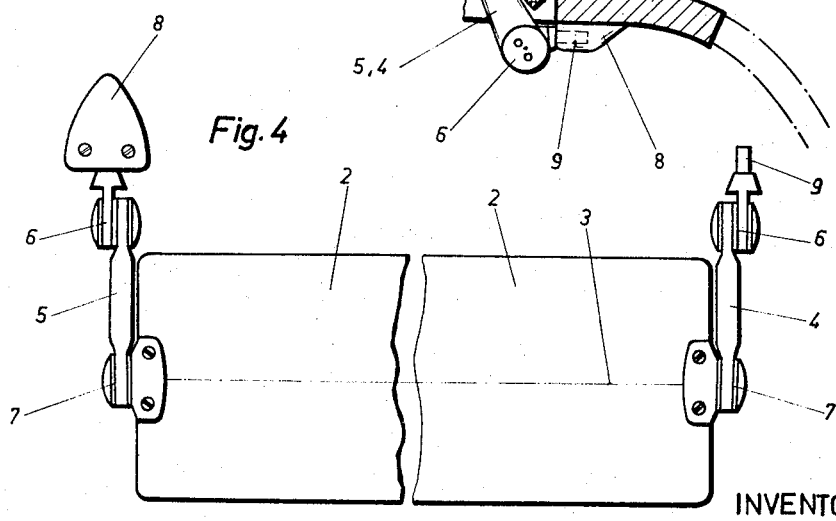
FIG. 4 is a top plan view showing the panel according to the invention with retaining arm.

The panel 2 consists of colored, transparent plastics material and is rotatable in the bearings 7 about the axis 3 between two arms 4 and 5. Each of the arms 4 and 5 is provided with a friction-type articulated joint 6 provided with interlocking means 6', 7'. The free ends 9 of the arms are fitted in socket members 8, which are mounted on the underside of the stationary part 10 of the roof of the body. In FIGS. 1, 2 and 3, the panel 2 is shown in four different positions relative to the opening 11 for the sliding roof 12.

In the position shown in dotted lines in FIG. 3, the panel deflects the relative wind into the interior of the car body.

I claim:
1. An adjustable shielding assembly for a motor vehicle having a body including a passenger compartment which includes a top opening and which comprises a windshield extending transversely of said top opening and of the direction of movement of said vehicle, said assembly comprising two socket members adapted to be secured to said body on opposite sides of said top opening thereof two arms each having a first portion received in one of said socket members and a second portion turnably connected to said first portion for pivoting movement about a first axis transverse to said direction of movement, said second portions each carrying a bearing spaced from the respective socket member and said bearings being aligned with one another on a second axis parallel to said first axis, and an elongated panel rotatably mounted for rotary movement in said bearings about said second axis and for pivotal movement about said first axis between a first end position in which said panel is located within said passenger compartment, and a second end position in which said panel is located without said passenger compartment.

2. An assembly as set forth in claim 1, in which each of said second portion of said arms comprises two mutually displaceable portions.

3. An assembly as set forth in claim 2 and further comprising an articulated joint connecting said mutually displaceable portions of each arm intermediate the respective socket member and bearing.

4. An assembly as set forth in claim 3, wherein at least one of said articulated joints is a self-locking joint.

5. An assembly as set forth in claim 4, wherein at least said one of said articulated joints comprise two sections frictionally engaging one another.

6. An assembly as set forth in claim 4, wherein at least said one of said articulated joints comprises interlocking means.

7. An assembly as set forth in claim 1, wherein at least one of said bearings is a self-locking bearing.

8. An assembly as set forth in claim 7, wherein at least said one of said bearings comprises two elements frictionally engaging one another.

9. An assembly as set forth in claim 7, wherein at least said one of said bearings comprises interlocking means.

10. A motor vehicle having a body including a passenger compartment which includes a top opening, two socket members secured to said body on opposite sides of said openings thereof, two arms each having a first portion received in one of said socket members and a second portion turnably connected to said first portion for pivoting movement about a first axis transverse to the direction of movement of said vehicle, said second portions of said arms carrying a bearing spaced from the respective socket members and said bearings being aligned on a second axis parallel to said first axis, and an elongated panel mounted for rotary movement in said bearings about said second axis, and for pivotal movement about said first axis between a first end position in which said panel is located within said passenger compartment and a second end portion in which said panel is located without said passenger compartment.

11. A motor vehicle as set forth in claim 10; and further comprising a sliding roof section disposed in said opening and a stationary roof section defining the front end of said opening, said socket members being secured to said stationary roof section.

12. A motor vehicle as set forth in claim 10, wherein said passenger compartment comprises a windshield and a windshield frame, and wherein said socket members are secured to said windshield frame.

References Cited

UNITED STATES PATENTS

| 1,380,471 | 6/1921 | Francisco | 296—84 |
| 1,581,788 | 4/1926 | Cornforth | 296—84 |
| 2,991,094 | 7/1961 | Baier et al. | 296—96 X |
| 3,089,728 | 5/1963 | Shumaker | 296—91 |

FOREIGN PATENTS 780,209    4/1935    France.

LEO FRIAGLIA, *Primary Examiner.*

BENJAMIN HERSH, *Examiner.*

J. A. PEKAR, *Assistant Examiner.*